US008008380B2

(12) United States Patent
Koers et al.

(10) Patent No.: US 8,008,380 B2
(45) Date of Patent: Aug. 30, 2011

(54) ACCELERATOR SOLUTION

(75) Inventors: Frederik Willem Karel Koers, Epse (NL); John Meijer, Deventer (NL); Anna Gerdine van de Bovenkamp-Bouwman, Nijkerk (NL)

(73) Assignee: AKZO Nobel N.V., Arnhem (NL)

( * ) Notice: Subject to any disclaimer, the term of this patent is extended or adjusted under 35 U.S.C. 154(b) by 0 days.

(21) Appl. No.: 12/593,980

(22) PCT Filed: Mar. 31, 2008

(86) PCT No.: PCT/EP2008/053803
§ 371 (c)(1),
(2), (4) Date: Sep. 30, 2009

(87) PCT Pub. No.: WO2008/119783
PCT Pub. Date: Oct. 9, 2008

(65) Prior Publication Data
US 2010/0120977 A1    May 13, 2010

Related U.S. Application Data

(60) Provisional application No. 60/926,353, filed on Apr. 26, 2007.

(30) Foreign Application Priority Data

Apr. 2, 2007   (EP) .................................... 07105446

(51) Int. Cl.
*C08K 5/34*    (2006.01)
*C08K 5/51*    (2006.01)
*C08K 5/38*    (2006.01)
*C08K 5/10*    (2006.01)
*C08K 3/10*    (2006.01)
*C08K 3/22*    (2006.01)

(52) U.S. Cl. ........ 524/102; 524/147; 524/210; 524/309; 524/386; 524/413; 524/431; 524/436; 524/599; 252/182.14; 528/275

(58) Field of Classification Search ............. 252/182.14; 524/599, 102, 147, 210, 309, 386, 413, 431, 524/436; 528/275, 277
See application file for complete search history.

(56) References Cited

U.S. PATENT DOCUMENTS

| 5,235,010 A | 8/1993 | Giovando |
| 5,470,896 A | 11/1995 | Wegmann et al. |

FOREIGN PATENT DOCUMENTS

| GB | 1 192 166 | 5/1970 |
| GB | 1 459 638 | 12/1976 |
| JP | 55-000731 | 1/1980 |
| WO | WO 90/12824 | 11/1990 |
| WO | WO 90/17825 | 11/1990 |
| WO | WO 2006/034981 | 4/2006 |
| WO | WO 2006/128816 | 12/2006 |

OTHER PUBLICATIONS

International Search Report and Written Opinion, International PCT Application No. PCT/EP2008/053803, mailed Jun. 19, 2008.
International Preliminary Report on Patentability International PCT Application No. PCT/ EP2008/053803, mailed Apr. 9, 2009.
Search Report, European Application No. 07 10 5446, dated Jul. 16, 2007.

*Primary Examiner* — Kriellion A Sanders
(74) *Attorney, Agent, or Firm* — Kenyon & Kenyon LLP

(57) ABSTRACT

The invention relates to an accelerator solution comprising a complexing agent selected from the group consisting of complexing agents having a nitrogen atom and a hydroxyl group and bipyridine, a salt of a metal selected from the group consisting of transition metal, magnesium, and lithium, and optionally a solvent, wherein when the complexing agent has a nitrogen atom and a hydroxyl group, the amount of complexing agent in the accelerator solution is at least 5 wt %, based on the total weight of the accelerator solution, the amount of solvent is less than 50 wt %, and the amount of diethylene glycol as solvent is less than 25 wt %, based on the total weight of the accelerator solution.

10 Claims, No Drawings

US 8,008,380 B2

ACCELERATOR SOLUTION

REFERENCE TO RELATED APPLICATION(s)

This application is the U.S. National Phase of PCT/EP2008/053803 filed on Mar. 31, 2008 and claims the benefit of U.S. Provisional Application No. 60/926,353 filed on Apr. 26, 2007.

The invention relates to an accelerator solution comprising a metal salt, a complexing agent, and optionally a solvent.

Such accelerator solutions are known in the art, e.g. from WO 90/12824 and WO 90/12825. The accelerator solutions described in these references contain predominantly solvent. Also, WO 2006/128816 discloses storage-stable acceleration solutions suitable for forming a redox system with peroxides. These accelerator solutions comprise a reducing agent selected from ascorbic acid and sodium formaldehyde sulphoxylate. The accelerator solutions further contain predominantly organic oxygen-containing solvents in an amount of at least 70 wt %. The use of accelerator solutions having such high amounts of solvents, in particular high amounts of glycol, in gelcoats results in gelcoats which due to the exchange of the solvent with water tend to form blisters easily. A further disadvantage is constituted by the large amount of volatiles, which is undesirable from an environmental viewpoint.

It is an object of the present invention to provide novel acceleration solutions which provide an improved polymerization performance.

This object is achieved by an accelerator solution comprising a complexing agent selected from the group consisting of complexing agents having a nitrogen atom and a hydroxyl group and bipyridine, a salt of a metal selected from the group consisting of transition metal, magnesium, and lithium, and optionally a solvent, wherein when the complexing agent has a nitrogen atom and a hydroxyl group, the amount of complexing agent in the accelerator solution is at least 5 wt %, based on the total weight of the accelerator solution, the amount of solvent is less than 50 wt %, and the amount of diethylene glycol as solvent is less than 25 wt %, based on the total weight of the accelerator solution.

The accelerator solutions of the present invention allow for an improved polymerization performance, in particular in the curing of unsaturated polyester (UP) resins and acrylate resins.

In the curing of gelcoats, the gelcoat hardness increases in a shorter period of time and to a higher hardness value. The time to lamination is shortened, resulting in a higher production capacity. Use of the accelerator solution of the invention generally leads to an improved physical appearance of the gelcoat as well as enhancement of the physical and/or mechanical properties.

Whereas curing of acrylate resins at ambient temperature generally is not possible using conventional accelerator solutions, in particular cobalt-containing accelerator solutions, in combination with ketone peroxides, the inventors have surprisingly found that the accelerator solution of the invention allows acrylate resins to be cured at ambient temperature.

The invention further pertains to an accelerator solution comprising a complexing agent having a nitrogen atom and a hydroxyl group, a salt of a metal selected from the group consisting of transition metal, magnesium, and lithium, and optionally a solvent, wherein the amount of complexing agent in the accelerator solution is at least 5 wt %, based on the total weight of the accelerator solution, the amount of solvent is less than 50 wt %, and the amount of glycol, preferably diethylene glycol, as solvent is less than 25 wt %, based on the total weight of the accelerator solution.

This accelerator solution has the advantages as set out above.

The accelerator solution of the invention comprises a complexing agent selected from the group consisting of complexing agents having a nitrogen atom and a hydroxyl group and bipyridine The complexing agent having a nitrogen atom and a hydroxyl group can be suitably used with all metal salts. Suitable examples of complexing agents of the invention are monoethanol amine, diethanol amine (DETA), triethanol amine, and dimethylamino ethanol. Preferably, the complexing agent is diethanol amine.

Bipyridine is preferably used in combination with a salt of a transition metal, and of these most preferably in combination with a manganese salt.

The complexing agent generally is present in an amount of at least 0.1 wt %, preferably at least 0.5 wt %, and most preferably at least 5 wt %, and generally at most 60 wt %, preferably at most 50 wt %, and most preferably at most 40 wt %.

When the complexing agent comprises a nitrogen atom and a hydroxyl group, the complexing agent generally is present in an amount of at least 5 wt %, preferably at least 7 wt %, and most preferably at least 10 wt %, and generally at most 60 wt %, preferably at most 50 wt %, and most preferably at most 40 wt %.

When the complexing agent is bypyridine, the complexing agent generally is present in an amount of at least 0.1 wt %, preferably at least 0.2 wt %, and most preferably at least 0.5 wt %, and generally at most 60 wt %, preferably at most 50 wt %, and most preferably at most 40 wt %.

The accelerator solution further contains one or more metal salts, at least one of them being selected from the group consisting of transition metal salts, lithium salts, and magnesium salts. Preferred metal salts are copper, cobalt, iron, nickel, tin, manganese, vanadium, lithium, and magnesium salts. More preferred metal salts are copper, manganese, cobalt, iron, and vanadium salts.

Due to the toxicity of cobalt and vanadium, copper, manganese, and iron salts are the most preferred metal salts.

Combinations of metal salts—e.g. vanadium and copper salts, copper and manganese salts, vanadium and iron salts—can also be used.

The salt employed preferably is a halide, nitrate, sulphate, lactate, 2-ethyl-hexanoate, acetate, proprionate, butyrate, oxalate, laurate, oleate, linoleate, palmitate, stearate, acetyl acetonate, or naphthenate. More preferred salts are halides, nitrates, sulphates, naphthenates, 2-ethylhexanoates, and acetates. Examples of such salts are Cu(I) chloride, Cu(II) acetate, Cu(II) sulphate, Cu(II) 2-ethylhexanoate, Co(II) acetate, Fe(II) sulphate, Fe(III) chloride, V(II) 2-ethyl-hexanoate, Mn(II) acetate, Mn(II) naphthenate, and combinations thereof.

The metal salt(s) is/are present in the accelerator solution in a preferred total amount of at least 0.01 wt %, more preferably at least 0.1 wt %. The metal salt(s) preferably is/are present in a total amount of less than 10 wt %, more preferably less than 5 wt %, and most preferably less than 2 wt %, calculated as salt(s) and based on the total weight of the accelerator solution.

The weight ratio of metal salt to complexing agent generally is from 20:1 to 1:20, preferably from 15:1 to 1:15, and most preferably from 10:1 to 1:10.

The solvent used in the accelerating solution of the invention can be any solvent known in the art and suitable for use in such accelerating solutions. Typically, the solvent is an organic oxygen-containing solvent which comprises at least one oxygen atom and is capable of forming a complex with the metal present in the accelerator solution. The solvent preferably has a melting point of 0° C. or less. In general, the solvent will carry an aldehyde, ketone, ether, ester, alcohol, or carboxylic acid group.

Examples of suitable solvents are glycols such as ethylene glycol, glycerol, diethylene glycol, dipropylene glycol, and polyethylene glycol; isobutanol; pentanol; 1,2-dioximes, N-methylpyrrolidinone, N-ethylpyrrolidinone; esters such as dibutyl maleate, dibutyl succinate, ethyl acetate, butyl acetate, mono- and diesters of ketoglutaric acid, pyruvates; mono- and diesters, more in particular diethyl malonate and succinates; 1,2-diketones, in particular diacetyl and glyoxal; butyl dioxytol (also known as diethylene glycol monobutyl ether, formula $nBuOCH_2CH_2OCH_2CH_2OH$), benzyl alcohol, and fatty alcohols. In the context of the present application phosphorous-containing compounds are not considered to be solvents.

Preferred solvents are ethylene glycol, diethylene glycol, polyethylene glycol, N-methylpyrrolidone, ethyl acetate, butyl acetate, and butyl dioxytol. A mixture of two or more of the aforementioned solvents may also be used.

The accelerator solution generally comprises at least 0.1 wt %, preferably at least 1 wt %, and most preferably at least 2 wt %, and generally at most 50 wt %, more preferably at most 40 wt %, and preferably less than 35 wt %, more preferably less than 30 wt % of solvent, all based on the total weight of the accelerator solution.

The accelerator solution generally comprises less than 25 wt % of glycols, in particular diethylene glycol, based on the total weight of the accelerator solution. Preferably, the amount of glycols is less than 20 wt %, and most preferably less than 15 wt %, based on the total weight of the accelerator solution. The amount of glycols advantageously is so low as to reduce blister formation in gelcoats, as glycols are generally water-soluble and tend to exchange with water, causing blister formation in gelcoats.

A stabilizer may be present in the accelerator solution according to the invention. The stabilizer does not comprise a nitrogen atom as well as a hydroxyl. Suitable stabilizers are compounds that typically prevent crystallization of the metal salt(s) in the solution, for example tertiary amines such as triethyl amine; polyamines such as 1,2-(dimethyl amine) ethane; secondary amines such as diethyl amine; nicotinamide; itaconic acid; monobutyl dihydrophosphite; 1,3-diketones such as acetyl acetone, benzoyl acetone, and dibenzoyl methane; acetoacetates such as diethyl aceto-acetamide, methyl acetoacetate, and ethyl acetoacetate; and alkali metal salts such as lithium 2-ethylhexanoate, potassium 2-ethylhexanoate, sodium 2-ethyl-hexanoate, barium 2-ethyl hexanoate, and cesium 2-ethyl hexanoate; phosphorus-containing compounds such as diethyl phosphate, dibutyl phosphate, tributyl phosphate, triethyl phosphate, dibutyl phosphite, and triethyl phosphite; and ammonium salts such as ammonium 2-ethylhexanoate, and ammonium acetate. Preferred stabilizers are 1,3-diketones such as acetyl acetone, benzoyl acetone, and dibenzoyl methane, triethyl phosphate, dibutyl phosphate, and acetoacetates such as diethyl acetoacetamide, methyl acetoacetate, and ethyl acetoacetate. The acetoacetates are even more preferred stabilizers, with diethyl acetoacetamide being the most preferred stabilizer. In one embodiment of the invention, the combination of diethanol amine and diethyl acetoacetamide is used in the accelerator solution.

The stabilizers may be added to the accelerator solution as such, or they may be formed in situ. For example, alkali metal 2-ethylhexanoates can be prepared in situ in the accelerator solution, after addition of the alkali metal hydroxide, such as potassium hydroxide or sodium hydroxide, and 2-ethylhexanoic acid to the solution.

If one or more stabilizers are present in the accelerator solution, their amount preferably is at least 0.01 wt %, more preferably at least 0.1 wt %, and most preferably at least 1 wt %, and generally at most 70 wt %, more preferably at most 65 wt %, and most preferably at most 60 wt %, all based on the total weight of the accelerator solution.

The total amount of complexing agent and stabilizer generally is at least 6 wt %, more preferably at least 7 wt %, and most preferably at least 10 wt %, and generally at most 90 wt %, more preferably at most 80 wt %, and most preferably at most 70 wt %, all based on the total weight of the accelerator solution.

In one embodiment of the invention, the weight ratio of complexing agent to stabilizer is at least 0.5, preferably at least 1, and most preferably at least 1.5, and generally at most 6, preferably at most 3, and most preferably at most 2.5.

The accelerator solution according to the present invention may optionally comprise water. If present, the water content of the solution preferably is at least 0.01 wt % and more preferably at least 0.1 wt %. The water content preferably is not more than 50 wt %, more preferably not more than 40 wt %, more preferably still not more than 20 wt %, even more preferably not more than 10 wt %, and most preferably not more than 5 wt %, all based on the total weight of the accelerator solution.

The accelerator solution according to the invention may further comprise one or more reducing agents. The reducing agent can be any reducing agent known in the art. Examples of reducing agents include ascorbic acid, which term in this specification includes L-ascorbic acid and D-isoascorbic acid, sodium formaldehyde sulphoxylate (SFS), reducing sugars like glucose and fructose, oxalic acid, phosphines, phosphites, organic or inorganic nitrites, organic or inorganic sulphites, organic or inorganic sulphides, mercaptanes, amines, and aldehydes. Also a mixture of ascorbic acid and SFS, optionally in combination with other reducing agents, may be used.

The reducing agent generally is present in the accelerator solution in an amount of less than 10 wt %, preferably less than 5 wt %, more preferably less than 2 wt %, and even more preferably less than 1 wt %. In one embodiment, the reducing agent is absent.

The accelerator solution according to the present invention can be prepared by any method known in the art, e.g. by simply mixing the ingredients, optionally with intermediate heating and/or mixing steps. There is no specific order of addition which has to be applied.

The accelerator solution according to the present invention can be used for curing and polymerization initiation with peroxides, in particular with hydro-peroxides and ketone peroxides.

The accelerator solution can also be used as paint dryer in coating compositions.

Curing

The invention further relates to a process for curing unsaturated polyester (UP) and acrylate resins. In the context of the present application, the terms "unsaturated polyester resin" and "UP resin" refer to the combination of unsaturated polyester resin and ethylenically unsaturated monomeric compound. The term "acrylate resin" refers to the combination of acrylate resin and ethylenically unsaturated monomeric compound. UP resins and acrylate resins as defined above are common practice and commercially available. Curing is generally started by adding the accelerator solution according to the invention and the initiator (peroxide) to the polyester or acrylate resin.

As a result of the storage stability of the accelerator solution of the present invention, it is also possible to pre-mix the resin and the accelerator solution days or weeks before the addition of the peroxide and, consequently, the start of the actual curing process. This allows commercial trade of a curable resin composition which already contains an accelerator. The present invention therefore also relates to a composition comprising a curable unsaturated polyester or a curable acrylate resin and the accelerator solution according to the present invention.

When both the peroxide and the accelerator solution according to the invention have been added to the curable resin, the resulting mixture is mixed and dispersed. The curing process can be carried out at any temperature from −5° C. up to 250° C., depending on the initiator system, the accelerator system, the compounds to adapt the curing rate, and the resin composition to be cured. Preferably, it is carried out at ambient temperatures commonly used in applications such as hand lay-up, spray-up, filament winding, resin transfer moulding, coating (e.g. gelcoat and standard coatings), button production, centrifugal casting, corrugated sheets or flat panels, relining systems, kitchen sinks via pouring compounds, etc. However, it can also be used in SMC, BMC, pultrusion techniques, and the like, for which temperatures up to 180° C., more preferably up to 150° C., most preferably up to 100° C., are used.

UP resins include so-called ortho resins, iso resins, iso-npg resins, vinyl ester resins, and dicyclopentadiene (DCPD) resins. Examples of such resins are maleic, fumaric, allylic, vinylic, and epoxy-type materials.

Acrylate resins include acrylates, methacrylates, diacrylates and dimethacrylates, and oligomers thereof.

The ethylenically unsaturated reactive monomer can be any such monomer known in the art. Examples of such ethylenically unsaturated reactive monomers include styrene and styrene derivatives such as a-methyl styrene, vinyl toluene, indene, divinyl benzene, vinyl pyrrolidone, vinyl siloxane, vinyl caprolactam, stilbene, but also diallyl phthalate, dibenzylidene acetone, allyl benzene, methyl methacrylate, methylacrylate, (meth)acrylic acid, diacrylates, dimethacrylates, acrylamides; vinyl acetate, triallyl cyanurate, triallyl isocyanurate, allyl compounds which are used for optical applications (such as (di)ethylene glycol diallyl carbonate), and mixtures thereof.

The amount of ethylenically unsaturated monomer preferably is at least 0.1 wt %, based on the weight of the resin, more preferably at least 1 wt %, and most preferably at least 5 wt %. The amount of ethylenically unsaturated monomer preferably is not more than 50 wt %, more preferably not more than 40 wt %, and most preferably not more than 35 wt %.

In this curing process, the accelerator solution is generally employed in a conventional amount. Amounts of at least 0.01 wt %, preferably at least 0.1 wt %, and not more than 5 wt %, preferably not more than 2 wt % of the accelerator solution, based on the weight of the resin, are typically used.

Peroxides suitable for the curing of UP and acrylate resins include organic peroxides, such as conventionally used ketone peroxides, peresters, and peroxydicarbonates, but also peroxycarbonates, perketals, hydroperoxides, and diacyl peroxides. The skilled person will understand that these peroxides can be combined with conventional additives, for instance phlegmatizers, such as hydrophilic esters and hydrocarbon solvents.

The amount of peroxide to be used in the curing process preferably is at least 0.1 wt %, more preferably at least 0.5 wt %, and most preferably at least 1 wt %. The amount of peroxide preferably is not more than 8 wt %, more preferably not more than 5 wt %, most preferably not more than 2 wt %, all based on the weight of the resin.

Other optional additives may be employed in the curing process according to the invention, such as fillers, glass fibres, pigments, inhibitors, and promoters.

In the curing process of the present invention, typically the resin is first mixed with the accelerator solution. The accelerator composition can be added in several different manners and may have been pre-mixed with the resin. The peroxide formulation can be added directly to the mixture. However, it can also be first mixed with the monomer or resin. Care is to be taken that the peroxide formulation and the accelerator solution are not pre-mixed, since this would be hazardous.

Polymerization Initiation

The accelerator solution according to the present invention can also be used to accelerate the polymerization initiation in redox polymerization processes. Such polymerization processes may be carried out in the usual manner, for example in bulk, suspension, emulsion, or solution.

The peroxide and the accelerator solution can be added at the start of the polymerization process, or they can be dosed partly or in their entirety during the polymerization process. It is also possible to add the peroxide at the start of the polymerization process, while the accelerator solution is added during the said process, or vice versa.

The desired amounts of peroxide and accelerator solution vary depending on the polymerization temperature, the capacity for removing the heat of polymerization, the kind of monomer to be used, and the applied pressure. Usually, from 0.001-10 wt % of peroxide, based on the weight of the (co) polymer, is employed. Preferably, from 0.001-5 wt % of peroxide is employed and most preferably from 0.001-2 wt %. The ratio of peroxide to metal salt preferably ranges from 0.2-100.

The polymerization temperature usually is 5° to 300° C., preferably 10° to 180° C. In general, if it is below 5° C., the polymerization time becomes too long.

However, when it exceeds 300° C., the radical is spent in the initial stage of the polymerization, making it difficult to attain a high conversion. In order to reduce the amount of unreacted monomer, however, it is also possible to conduct the polymerization using a temperature profile, e.g., to perform the initial polymerization at below 100° C. and then elevate the temperature above 100° C. to complete the polymerization. These variations are all known to the man skilled in the art, who will have no difficulty selecting the reaction conditions of choice, depending on the particular polymerization process and the specific radical polymerization initiator to be used.

Suitable monomers for polymerization using the accelerator solution according to the present invention are olefinic or ethylenically unsaturated monomers, for example substituted or unsubstituted vinyl aromatic monomers, including styrene, α-methyl styrene, p-methyl styrene, and halogenated styrenes; divinyl benzene; ethylene; ethylenically unsaturated carboxylic acids and derivatives thereof, such as (meth) acrylic acids, (meth)acrylic esters, such as 2-ethylhexyl acrylate, 2-ethylhexyl methacrylate, and glycidyl methacrylate; ethylenically unsaturated nitriles and amides, such as acrylonitrile, methacrylonitrile, and acrylamide; substituted or unsubstituted ethylenically unsaturated monomers, such as butadiene, isoprene, and chloroprene; vinyl esters, such as vinyl acetate and vinyl propionate; ethylenically unsaturated dicarboxylic acids and their derivatives including mono- and diesters, anhydrides, and imides, such as maleic anhydride, citraconic anhydride, citraconic acid, itaconic acid, nadic anhydride, maleic acid, fumaric acid, aryl, alkyl, and aralkyl citraconimides, maleimides, biscitraconimides, and bismaleimides; vinyl halides, such as vinyl chloride and vinylidene chloride; vinyl ethers, such as methyl vinyl ether and n-butyl vinyl ether; olefins, such as isobutene and 4-methyl pentene; allyl compounds, such as (di)allyl esters, for example diallyl phthalates, (di)allyl carbonates, and triallyl (iso)cyanurate.

During (co)polymerization, the formulations may also contain the usual additives and fillers. As examples of such additives may be mentioned: inhibitors of oxidative, thermal, or ultraviolet degradation, lubricants, extender oils, pH controlling substances, such as calcium carbonate, release agents, colourants, reinforcing or non-reinforcing fillers such as silica, clay, chalk, carbon black, and fibrous materials, such as glass fibres, plasticizers, diluents, chain transfer agents, accelerators, and other types of peroxides. These additives may be employed in the usual amounts.

The invention is illustrated in the following examples.

EXAMPLES

In the Examples below, the following ingredients were used:

| | |
|---|---|
| Bufa-Marine 722-0166/NPA | Unsaturated polyester/neopentylglycol resin (UP-NPG resin), ex Bufa |
| Derakane Momentum 411-350 | Vinyl Ester-based resin (VE), ex Dow |
| Palatal ® P6 | Ortho Phthalic Acid-based resin (OPA resin), ex DSM |
| Degament 1004 | Polymethyl methacrylate resin (PMMA resin), ex Degussa |
| Butanox M50 ® | A commercial methyl ethyl ketone peroxide ex Akzo Nobel |
| Butanox P50 ® | A commercial methyl isopropyl ketone peroxide ex Akzo Nobel |
| Perkadox CH50 | A commercial benzoyl peroxide ex Akzo Nobel |
| NL63-100 | Accelerator solution ex Akzo Nobel |
| BDO | Butyl dioxitol (diethylene glycol monobutyl ether) ex Chemproha |
| DEG | Diethylene glycol ex Baker analyzed |
| Eastman TXIB | 1-isopropyl-2,2-dimethyl trimethylene diisobutyrate ex Eastman |
| White Spirit | White spirit ex Elementis |
| Cu(II) acetate | Cu(II) acetate ex Baker analyzed |
| Co(II) acetate | Co(II) acetate ex Baker analyzed |
| Cu(I) chloride | Cu(I) chloride ex Baker analyzed |
| Cu(II) naphthenate | Cu(II) naphthenate ex Baker analyzed |
| Co(II) octanoate | Co(II) octanoate ex Elementis |
| Mn naphthenate | Mn naphthenate ex Phaltz & Bauer Inc. |
| Mn(II) acetate | Mn(II) acetate ex Baker analyzed |
| DETA | Diethanol amine ex Akzo Nobel |
| TEA | Triethanol amine ex Baker analyzed |
| K-octanoate | Potassium octanoate |
| KOH | Potassium hydroxide ex Baker analyzed |
| 2-EHA | 2-ethylhexanoic acid ex Basf |
| $NH_4$ acetate | Ammonium acetate ex Baker analyzed |
| EAA | Ethyl acetoacetate ex Baker analyzed |
| DEAA | Diethyl acetoacetamide ex Akzo Nobel |
| Nicotinamide | Nicotinamide ex Acros Organics |
| Bipyridine | Bipyridine ex Baker analyzed |
| Ascorbic acid | Ascorbic acid ex Baker analyzed |
| DBP | Dibutyl phosphate ex Baker analyzed |
| $NH_4$ hydroxide | Ammonium hydroxide ex Baker analyzed |
| ATH | Aluminium trihydroxide ex Albemarle |

In the Examples below, the curing of the unsaturated polyester resins was analyzed by the method of the Society of Plastic Institute (analysis method F/77.1; available from Akzo Nobel Polymer Chemicals). This method involves measuring of the peak exotherm, the time to peak, and the gel time.

According to this method, 25 g of a mixture comprising resin, peroxide, and accelerator solution were poured into a test tube and a thermocouple was placed through the enclosure at the centre of the tube. The glass tube was then placed in the oil bath maintained at a specific test temperature and the time-temperature curve was measured. From the curve the following parameters were calculated:

Gel time (Gt)=time in minutes elapsed between the start of the experiment and 5.6° C. above the bath temperature.

Time to peak exotherm (TTP)=time elapsed between the start of the experiment and the moment the peak temperature is reached.

Peak exotherm (PE)=the maximum temperature which is reached.

Gel time is the time from the mixing of the peroxide with the resin, and optionally with the accelerator solution, until the mixture gels and does not flow anymore using standard method of analysis F/72.1. This standard method of analysis is available from Akzo Nobel Polymer Chemicals.

In gelcoat applications the gel time is the time from mixing the peroxide with the gelcoat until the mixture gels and does not flow anymore. This is determined using a paperclip on a 400 μm gelcoat layer.

Time to lamination is the time from the start of mixing until the gelcoat layer is still tacky but upon touching no gelcoat transfers to a glove. This is the time when the laminate can be applied onto the gelcoat layer. Therefore, it is desirable to have a short time to lamination in order to increase productivity.

The Persoz hardness was measured according to method ISO-DR-1522.

The Barcol Hardness was measured in the conventional way after a certain period of time. Accordingly, the Barcol Hardness Tester was placed on the surface of the cured resin and pressed manually so that the indenter of the meter penetrated the surface. The hardness could be read directly on the meter. The Barcol 934 Hardness Tester is suitable for measuring hard surfaces and is used in the Examples below.

For determination of the residual styrene content, the cured resin composition was cut into small pieces and the residual styrene extracted by dichloromethane. The dichloromethane layer was then analyzed with gas chromatography using the conditions described in GC/94.5. This standard method of analysis is available from Akzo Nobel Polymer Chemicals.

Comparative Solutions A and B

Two comparative accelerator solutions were prepared. The ingredients of these solutions are shown in the Table below.

TABLE 1

| | | A | B |
|---|---|---|---|
| | | Amount | |
| Component | Category | (wt %) | |
| K-octanoate | Stabilizer | 18 | |
| BDO | Solvent | | |
| Cu-acetate | Metal salt | 2 | |
| Co-acetate | Metal salt | 8 | |
| TEA | Complexing agent | | |
| $NH_4$-acetate | Stabilizer | | |
| DETA | Complexing agent | 30 | |
| DEG | Solvent | 40 | |
| Co-octanoate | Metal salt | | 5 |

TABLE 1-continued

| Component | Category | A | B |
|---|---|---|---|
| | | Amount (wt %) | |
| Eastman TXIB | Solvent | | 90 |
| White spirit | Solvent | | 5 |
| Solvent content | | 40 | 95 |
| Complexing agent | | 30 | — |

Accelerator Solutions 1-10

Various accelerator solutions in accordance with the present invention were prepared. Their ingredients are shown in the Table below.

TABLE 2

| Component | Category | 1 | 2 | 3 | 4 | 5 | 6 | 7 | 8 | 9 | 10 |
|---|---|---|---|---|---|---|---|---|---|---|---|
| | | Amount (wt %) | | | | | | | | | |
| K-octanoate | Stabilizer | 18 | | 13 | | 18 | | 22 | 18 | 18 | 16 |
| BDO | Solvent | | 25 | | | | 49 | | | | |
| Cu(II) acetate | Metal salt | 4 | | 5 | 5 | 7 | | 5 | 3 | 3 | 7 |
| NH$_4$-hydroxide | Stabilizer | 1 | | | | | | | 3 | 10 | 1 |
| EAA | Stabilizer | 1 | | | | | | | 2 | 8 | 1 |
| DETA | Complex. agent | 25 | 25 | 25 | 25 | 15 | 29 | 25 | 23 | 17 | 15 |
| DEAA | Stabilizer | 43 | 45 | 40 | 40 | 43 | | 45 | 43 | 37 | 43 |
| DEG | Solvent | 6 | | 4 | 23 | 6 | | | 6 | 6 | 5 |
| Cu(I)chloride | Metal salt | | 5 | | | | | | | | |
| Nicotinamide | Stabilizer | | | 7 | 7 | 10 | | | | | 10 |
| Bipyridine | Complexing agent | | | | | | 5 | | | | |
| Mn-naphthenate | Metal salt | | | | | | 17 | | | | |
| Ascorbic acid | Reducing agent | | | | | | | 3 | | | |
| Solvent content | | 6 | 25 | 4 | 23 | 6 | 49 | — | 6 | 6 | 5 |
| Complex. agent | | 25 | 25 | 25 | 25 | 15 | 29 | 25 | 23 | 17 | 15 |
| DETA/DEAA ratio | | 1.7 | 1.8 | 1.6 | 1.6 | 2.9 | — | 1.8 | 1.9 | 2.2 | 2.9 |

The above accelerator solutions were used in the following Examples.

Example 1

Gelcoat compositions comprising 100 parts per 100 weight parts of resin (phr) of UP-NPG resin, 2 phr Butanox M50, and various accelerator solutions were prepared. The accelerator solution and the amounts in which it is used in the gelcoat compositions are shown in Table 3.

The properties measured were gel time (in accordance with method F/72.1), gel time and time to lamination of the applied gelcoat, Persoz hardness on 400-micron dry film, and residual styrene.

TABLE 3

| | Example | | |
|---|---|---|---|
| | C1 | C2 | 1 |
| Accelerator solution | A | B | 1 |
| Used amount (phr) | 0.3 | 1.5 | 1.0 |
| Gel time at 20° C. (min) | 8.4 | 9.5 | 10.1 |
| Gelcoat application at 20° C. | | | |
| Gel time (min) | 17 | 15 | 22 |
| TTL (min) | 102 | 112 | 58 |
| Persoz hardness | | | |
| After 1 hr (sec) | — | — | 24 |
| After 6 hrs (sec) | 43 | 61 | 171 |
| After 24 hrs (sec) | 68 | 117 | 208 |

TABLE 3-continued

| | Example | | |
|---|---|---|---|
| | C1 | C2 | 1 |
| Residual Styrene | | | |
| After 3 days (wt %) | 2.1 | 1.4 | 1.0 |

From the above Table it is clear that compared to using accelerator solution A or B (not in accordance with the invention), curing using accelerator solution 1 in accordance with the invention leads to an increase in gel time and a decrease in time to lamination as well as a decrease of the amount of residual styrene. Moreover, a significant increase in hardness of the gelcoat of Example 1 is observed compared to the gelcoats of Comparative Examples C1 and C2.

Examples 2-4

UP resin compositions comprising 100 phr of Palatal P6 resin, 2 phr Butanox M50, and various accelerator solutions in accordance with the invention were prepared. The accelerator solution and the amounts in which it is used in the resin compositions are shown in Table 4.

The properties measured were gel time (in accordance with method F/72.1), and gel time, time to peak exotherm, and peak exotherm in accordance with the SPI standard.

TABLE 4

| | Example | | |
|---|---|---|---|
| | 2 | 3 | 4 |
| Accelerator solution | 3 | 4 | 5 |
| Used amount (phr) | 1 | 1 | 1 |
| Gel time at 20° C. (min) | 9.1 | 10.8 | 9.0 |
| Cure processing at 20° C. | | | |
| Gt (min) | 9.5 | 10.1 | 8.4 |
| TTP (min) | 13.1 | 13.5 | 11.4 |
| PE (° C.) | 158 | 152 | 149 |

Curing of the UP resins of Examples 2 and 3 demonstrates that varying amounts of solvent do not significantly affect the curing properties. Similar results are observed for the resins of Examples 2 and 4, where the ratio of complexing agent (DETA) to stabilizer (DEAA) in the accelerator solution was varied.

Examples 5 and 6

Vinyl ester compositions comprising 100 phr of Dekarane Momentum 411-350 resin, 2 phr of Butanox M50, and various accelerator solutions were prepared. The accelerator solution and the amounts in which it is used in the resin compositions are shown in Table 5.

The properties measured were gel time (in accordance with method F/72.1), and gel time, time to peak exotherm, and peak exotherm in accordance with the SPI standard.

TABLE 5

|  | Example | | |
| --- | --- | --- | --- |
|  | C3 | 5 | 6 |
| Accelerator solution | A | 1 | 2 |
| Used amount (phr) |  | 1.0 | 1.0 |
| Gel time at 20° C. (min) | 6.2 | 15.1 | 12.7 |
| Cure processing 20° C. | | | |
| Gt (min) | 8.3 | 15.6 | 13.5 |
| TTP (min) | 45.2 | 46.5 | 37.5 |
| PE (° C.) | 56 | 70 | 69 |

The vinyl ester resin compositions of Examples 5 and 6 reveal a higher peak exotherm temperature than the compositions of Comparative Example C3, which means that the curing activity of the compositions according to the invention is higher, despite a significantly longer gel time (Gt).

Examples 7-10

UP resin compositions comprising 100 phr of Palatal P6 resin, 2 phr of Butanox P50, and various accelerator solutions were prepared. The accelerator solution and the amounts in which it is used in the resin compositions are shown in Table 6.

The properties measured were gel time (in accordance with method F/72.1), and gel time, time to peak exotherm, and peak exotherm in accordance with the SPI standard.

TABLE 6

|  | Example | | | | |
| --- | --- | --- | --- | --- | --- |
|  | C4 | 7 | 8 | 9 | 10 |
| Accelerator solution | A | 1 | 2 | 6 | 7 |
| Used amount (phr) | 0.25 | 1.0 | 0.5 | 0.5 | 0.5 |
| Gel time 20° C. (min) | 10.2 | 10.3 | 13.1 | 11.9 | 17.5 |
| Cure processing 20° C. | | | | | |
| Gt (min) | 6.4 | 10.4 | 10.2 | 11.4 | 10.5 |
| TTP (min) | 11.3 | 15.1 | 14.5 | 14.6 | 19.2 |
| PE (° C.) | 178 | 156 | 152 | 173 | 159 |

The Table above demonstrates that UP resin compositions can be cured using accelerator solutions comprising Cu(I) as well as Cu(II) and Mn salts with similar curing characteristics compared to the composition of Comparative Example C4. The presence of a reducing agent in the accelerator solution used in the composition of Example 10 shows a higher gel time at 20° C. as well as a higher time to peak compared to the compositions of Examples 7-9.

Examples 11-13

A pre-accelerated UP resin composition (Example 11) comprising 100 phr of Palatal P6 resin and accelerator solution was prepared. The accelerator solution and the amounts in which it is used in the resin are shown in Table 7.

Acrylate resin compositions (Examples 12 and 13) comprising 100 phr of Degament 1004 resin and various accelerator solutions were prepared. The accelerator solution and the amounts in which it is used in the pre-accelerated resin are shown in Table 7.

For these three resins the gel time (in accordance with method F/72.1) was measured as a function of storage time. Before the gel time measurement, 2 phr of Butanox P50 was added to the pre-accelerated resin.

TABLE 7

|  | Example | | |
| --- | --- | --- | --- |
|  | 11 | 12 | 13 |
| Accelerator solution | 2 | 9 | 10 |
| Used amount (phr) | 1 | 1 | 1 |
| Gel time 20° C. (min) | | | |
| At start | 3.0 | 41 | 38 |
| After 4 days | 4.3 | 47 | 42 |
| After 14 days | 3.7 | | |
| After 19 days |  | 53 | 45 |
| After 32 days | 4.8 | 55 | 47 |
| After 64 days | 5.5 | | |

The pre-accelerated resin formulations of Examples 11-13 have a good storage stability as the gel time does not significantly increase over time, which is an indication that the reactivity decreases hardly or not at all.

Examples 14-16

Acrylate resin compositions comprising 100 phr of Degament 1004 resin, 2 phr of Butanox P50, 60 phr of ATH, and various accelerator solutions were prepared. The accelerator solution and the amounts in which it is used in the resin compositions are shown in Table 8. It is noted that for Comparative Example C5 3 phr of Perkadox CHSO and 0.5 phr of Accelerator NL63-100 were added to the acrylate resin composition.

The properties measured were gel time, time to peak exotherm, and peak exotherm in accordance with the SPI standard, and the Barcol Hardness.

TABLE 8

|  | Example | | | |
| --- | --- | --- | --- | --- |
|  | C5 | 14 | 15 | 16 |
| Accelerator solution |  | 8 | 8 | 9 |
| Used amount (phr) |  | 1 | 1.7 | 1.7 |
| Cure processing 20° C. | | | | |
| Gt (min) | 29 | 69 | 43 | 36 |
| TTP (min) | 44 | 90 | 62 | 57 |
| PE (° C.) | 81 | 70 | 79 | 80 |
| Barcol Hardness at 20° C. | | | | |
| after 24 hrs | 45-50 | — | — | 50 |

It is demonstrated that the UP resin compositions comprising accelerator solutions 8 and 9 (in accordance with the invention) provide a similar cure behaviour at 20° C. as the resin composition of the Comparative Example. This is surprising, as curing of resin compositions using metal salt-containing accelerator solutions in combination with a ketone peroxide is not usually observed at ambient temperature.

Accelerator Solutions 11-16

In the following Examples acceleration solutions 11-16, which are in accordance with the invention, were used. The ingredients of these accelerator solutions are shown in the Table below.

| Component | Category | 11 | 12 | 13 | 14 | 15 | 16 |
|---|---|---|---|---|---|---|---|
| | | | | Amount (wt %) | | | |
| BDO | Solvent | 47.8 | 47.7 | 42.0 | 42.3 | | 20.0 |
| DEG | Solvent | | | | | 5.6 | |
| Cu(II) acetate | Metal salt | | 0.1 | | | 5.0 | |
| Mn(II) acetate | Metal salt | 1.5 | 1.5 | | | | |
| Cu-naphthenate | Metal salt | | | | 0.1 | | |
| Mn-naphthenate | Metal salt | | | 5.8 | 5.8 | | |
| Cu(I) chloride | Metal salt | | | | | | 5.0 |
| Bipyridine | Complexing agent | 0.5 | 0.5 | 1.7 | 1.7 | | |
| TEA | Complexing agent | | | | | | |
| DETA | Complexing agent | | | | | 25.0 | 25.0 |
| DEAA | Stabilizer | 16.7 | 16.7 | 16.7 | 16.7 | 45.0 | 45.0 |
| DBP | Stabilizer | 28.5 | 28.5 | 28.5 | 28.5 | | 10.0 |
| 2-EHA | Stabilizer | | | | | 13.5 | |
| KOH | Stabilizer | | | | | 5.9 | |
| Nicotinamide | Stabilizer | | | 0.2 | | | |
| AA | Reducing agent | 5.0 | 5.0 | 5.0 | 5.0 | | |
| Solvent content (wt %) | | 48 | 48 | 42 | 42 | 6 | 20 |
| Complexing agent (wt %) | | 0.5 | 0.5 | 1.7 | 1.7 | 25 | 25 |
| DETA/DEAA ratio | | | | | | 1.8 | 1.8 |

The above accelerator solutions were used in the following Examples.

Examples 17-20

UP resin compositions comprising 100 phr of Palatal P6 resin, 2 phr Butanox M50, and various accelerator solutions in accordance with the invention were prepared. The accelerator solution and the amounts in which it is used in the resin compositions are shown in Table 9.

The properties measured were gel time (in accordance with method F/72.1), and gel time, time to peak exotherm, and peak exotherm in accordance with the SPI standard.

TABLE 9

| | Example | | | |
|---|---|---|---|---|
| | 17 | 18 | 19 | 20 |
| Accelerator solution | 11 | 12 | 13 | 14 |
| Used amount (phr) | 1 | 1 | 1 | 1 |
| Gel time at 20° C. (min) | 7.1 | 7.7 | 4.9 | 5.4 |
| Cure processing at 20° C. | | | | |
| Gt (min) | 7.3 | 8.1 | 4.0 | 5.6 |
| TTP (min) | 29.6 | 29.0 | 15.1 | 20.4 |
| PE (° C.) | 75 | 90 | 156 | 111 |

Examples 21-24

UP resin compositions comprising 100 phr of Palatal P6 resin, 2 phr Butanox P50, and various accelerator solutions in accordance with the invention were prepared. The accelerator solution and the amounts in which it is used in the resin compositions are shown in Table 10.

The properties measured were gel time (in accordance with method F/72.1), and gel time, time to peak exotherm, and peak exotherm in accordance with the SPI standard.

TABLE 10

| | Example | | | |
|---|---|---|---|---|
| | 21 | 22 | 23 | 24 |
| Accelerator solution | 11 | 12 | 13 | 14 |
| Used amount (phr) | 1 | 1 | 1 | 1 |
| Gel time at 20° C. (min) | 6.1 | 6.7 | 4.6 | 5.0 |
| Cure processing at 20° C. | | | | |
| Gt (min) | 6.6 | 7.2 | 3.6 | 4.5 |
| TTP (min) | 22.5 | 22.3 | 11.1 | 14.6 |
| PE (° C.) | 144 | 150 | 175 | 162 |

The results of both Tables 9 and 10 demonstrate that manganese-based accelerator solutions comprising bipyridine as complexing agent exhibit good properties for UP resin curing.

Examples 25-27

UP resin compositions comprising 100 phr of Palatal P6 resin, 2 phr of organic peroxide, and various accelerator solutions in accordance with the invention were prepared. The accelerator solution and the amounts in which it is used in the resin compositions as well as the type and amount of peroxide initiator are shown in Table 11.

For comparison, the same procedure was used except that the individual ingredients of the accelerator solution were added separately to the UP resin in the same amounts as used in Examples 25-27. It was observed for the Comparative Examples of Examples 25 and 26 that the metal salts appear to be incompletely dissolved when added as such to the UP resin.

The properties measured were gel time (in accordance with method F/72.1), and gel time, time to peak exotherm, and peak exotherm in accordance with the SPI standard.

TABLE 11

| | Example | | |
|---|---|---|---|
| | 25 | 26 | 27 |
| Butanox M50 (phr) | 2 | | |
| Butanox P50 (phr) | | 2 | 2 |
| Accelerator solution | 15 | 15 | 16 |
| Used amount (phr) | 1 | 1 | 1 |
| Gel time at 20° C. (min) | 14.8 | 10.1 | 9.3 |
| Cure processing at 20° C. | | | |
| Gt (min) | 11.3 | 6.5 | 4.4 |
| TTP (min) | 15.2 | 10.2 | 9.1 |
| PE (° C.) | 164 | 147 | 138 |

In general, the curing of UP resin using the accelerator solutions of the invention reveals good gel time properties at 20° C. and reveals good curing behaviour. Their respective Comparative Example revealed significantly faster gel formation—in particular the Comparative Example of Example 27 forms a gel almost instantly—providing considerably poorer curing properties.

The invention claimed is:

1. An accelerator solution comprising a complexing agent selected from the group consisting of (i) complexing agents having a nitrogen atom and a hydroxyl group and (ii) bipyridine, a salt of a metal selected from the group consisting of transition metal, magnesium, and lithium, and optionally a solvent, wherein when the complexing agent has a nitrogen atom and a hydroxyl group, the amount of complexing agent in the accelerator solution is at least 5 wt%, based on the total weight of the accelerator solution, the amount of solvent is less than 50 wt%, and the amount of diethylene glycol as solvent is less than 25 wt%, based on the total weight of the accelerator solution.

2. The accelerator solution according to claim 1 wherein the complexing agent is selected from the group consisting of monoethanol amine, diethanol amine, triethanol amine, and dimethylamino ethanol.

3. The accelerator solution according to either claim 1 wherein the metal is selected from the group consisting of copper, manganese, and iron.

4. The accelerator solution according to claim 1 further comprising a stabilizer.

5. The accelerator solution according to claim 4 wherein the stabilizer is selected from the group consisting of diethyl acetoacetamide, methyl acetoacetate, triethyl phosphate, dibutyl phosphate, and ethyl acetoacetate.

6. The accelerator solution according to any claim 4 wherein the complexing agent is diethanol amine and the stabilizer is diethyl acetoacetamide, or wherein the complexing agent is bipyridine and the stabilizer is dibutyl phosphate.

7. An unsaturated polyester (UP) resin or acrylate resin comprising the accelerator solution according to claim 1.

8. A method for the curing of unsaturated polyester (UP) resin or acrylate resin, the method comprising adding the accelerator according to claim 1 and an initiator to the polyester resin or acrylate resin.

9. A method for polymerization initiation, the method comprising adding the accelerator solution according to claim 1 and a peroxide at the start of a polymerization process or during a polymerization process.

10. A coating composition comprising the accelerator solution according to claim 1.

* * * * *